(12) United States Patent
Lindner et al.

(10) Patent No.: US 9,924,108 B2
(45) Date of Patent: Mar. 20, 2018

(54) GOAL RECOGNITION SYSTEM AND METHOD FOR RECOGNIZING A GOAL

(71) Applicant: GoalControl GmbH, Wuerselen (DE)

(72) Inventors: Bjoern Lindner, Aachen (DE); Juergen Philipps, Aachen (DE); Rene Beaujean, Aachen (DE)

(73) Assignee: GoalControl GmbH, Wuerselen (DE)

( * ) Notice: Subject to any disclaimer, the term of this patent is extended or adjusted under 35 U.S.C. 154(b) by 847 days.

(21) Appl. No.: 14/299,892

(22) Filed: Jun. 9, 2014

(65) Prior Publication Data

US 2014/0285669 A1    Sep. 25, 2014

Related U.S. Application Data

(63) Continuation of application No. PCT/DE2012/004461, filed on Dec. 5, 2012.

(30) Foreign Application Priority Data

Dec. 7, 2011 (DE) .................. 10 2011 120 368

(51) Int. Cl.
| | |
|---|---|
| G06T 7/00 | (2017.01) |
| H04N 5/247 | (2006.01) |
| A63B 63/00 | (2006.01) |
| A63B 71/06 | (2006.01) |

(Continued)

(52) U.S. Cl.
CPC ............ H04N 5/247 (2013.01); A63B 63/004 (2013.01); A63B 71/0605 (2013.01); G06T 7/70 (2017.01); A63B 2024/0028 (2013.01); A63B 2220/806 (2013.01); A63B 2220/807 (2013.01); A63B 2225/12 (2013.01); G06T 2207/10004 (2013.01); G06T 2207/10016 (2013.01); G06T 2207/30224 (2013.01); G06T 2207/30241 (2013.01)

(58) Field of Classification Search
CPC .................................. H04N 5/247; G06T 7/70
USPC ........................................................ 348/157
See application file for complete search history.

(56) References Cited

U.S. PATENT DOCUMENTS

| | | | |
|---|---|---|---|
| 6,201,473 B1 * | 3/2001 | Schaffer ................. | A47F 9/046 340/568.1 |
| 7,867,113 B2 | 1/2011 | Petersen | |
| 2006/0273522 A1 | 12/2006 | Marshall et al. | |

(Continued)

FOREIGN PATENT DOCUMENTS

| | | |
|---|---|---|
| DE | 200 11 144 U1 | 10/2000 |
| DE | 203 04 144 U1 | 9/2004 |

(Continued)

*Primary Examiner* — Jeffery Williams
(74) *Attorney, Agent, or Firm* — Muncy, Geissler, Olds & Lowe, P.C.

(57) ABSTRACT

A system and a method for goal recognition, in which a plurality of cameras monitor a goal line plane that is generated by a framework for a goal, wherein at least one camera module is provided which can be used to monitor a sector outside the goal laterally adjacent to the framework or in front of the framework in the direction of a playing field in order to determine a trajectory for a playing body in the region of the playing field in the direction of the goal, wherein the operation of the cameras for monitoring the goal line plane and/or the evaluation of the image data therefrom can be controlled on the basis of the image data from the camera module.

13 Claims, 5 Drawing Sheets

(51) Int. Cl.
*G06T 7/70* (2017.01)
*A63B 24/00* (2006.01)

(56) References Cited

U.S. PATENT DOCUMENTS

| | | | |
|---|---|---|---|
| 2010/0026809 A1* | 2/2010 | Curry | H04N 5/222 348/157 |
| 2010/0201781 A1* | 8/2010 | Trubko | G02B 13/06 348/36 |
| 2012/0238383 A1 | 9/2012 | Simonnet et al. | |
| 2013/0201344 A1* | 8/2013 | Sweet, III | G06K 9/00261 348/169 |

FOREIGN PATENT DOCUMENTS

| | | | | |
|---|---|---|---|---|
| EP | 0 345 982 A1 | 12/1989 | | |
| EP | 0345982 A1 | * 12/1989 | ......... | A63B 24/0003 |
| EP | 2 085 123 A1 | 8/2009 | | |
| EP | 1 596 945 B1 | 8/2010 | | |
| FR | 2 806 924 A1 | 10/2001 | | |
| FR | 2806924 A1 | * 10/2001 | ......... | A63B 71/0605 |
| WO | WO 00/02628 A1 | 1/2000 | | |
| WO | WO 2011/006989 A1 | 1/2011 | | |

\* cited by examiner

GOAL RECOGNITION SYSTEM AND METHOD FOR RECOGNIZING A GOAL

This nonprovisional application is a continuation of International Application No. PCT/DE2012/001161, which was filed on Dec. 5, 2012, and which claims priority to German Patent Application No. 10 2011 120 368.4, which was filed in Germany on Dec. 7, 2011, and which are both herein incorporated by reference.

BACKGROUND OF THE INVENTION

Field of the Invention

The present invention relates to a goal recognition system and a method for recognizing a goal.

Description of the Background Art

In many types of sports in which a moving play object is played in the direction of a goal or the like, there is a need for determining with a high reliability whether or not the play object has past the goal. Examples of such types of sports include soccer, handball or ice hockey. Traditionally various technical aids have been known, for example, the use of sensors and/or cameras to determine whether the play object has crossed a goal line or the like. A few known technologies from the field of soccer are mentioned below as examples.

DE 200 11 144 U1 describes a so-called goal control system in which several high speed cameras are mounted on the two posts and/or on the lattice of a goal and thereby directed inward in the direction of a goal line plane. The distance between the individual cameras is designed to be small enough, so that it will be detected in any case if the ball crosses the goal line plane. The images of the high speed cameras are analyzed by means of an image processing electronic analyzer.

According to another technology it is known that so-called beam grids and/or a light barrier pattern may be provided on the post and/or on the lattice of a goal, so that it is recognizable when a ball crosses a goal line plane. Such technologies are known from DE 203 04 144 U1 or from EP 2 085 123 A1, for example. The disadvantage here is that it is impossible to detect with the greatest reliability when the ball has completely crossed through a goal line plane because in the usual rules of play a goal is to be counted only in this case.

Detection of a goal is possible not only by means of a camera but also by means of a sensor technology, by means of which a transmitter or the like is provided in the ball. Accordingly, when a ball crosses a goal line plane, a signal is transmitted to at least one receiver mounted on a post and/or on a crossbar of the goal, so that a goal is detected. Such a technology is known, for example, from EP 1 596 945 B1, which corresponds to U.S. Pat. No. 7,867,113. One disadvantage here is the configuration of the transmitter inside the ball because reliable transmission of signals cannot be ensured at all times due to vibrations or the like.

SUMMARY OF THE INVENTION

It is therefore an object of the invention to overcome the above disadvantages and to create a technology for recognizing a goal, such that it will ensure a high reliability using simple and inexpensive means.

In an embodiment, the invention is based on the finding that there are many cameras with which a goal line plane that is spanned by the framework of a goal is monitored and at least one additional camera module is controlled as a function of the image data. The same thing is also true for the analysis of the image data of the cameras for monitoring the goal line plane, which is done as a function of the image data of the additional camera module. This additional camera module is positioned, so that a sector laterally adjacent to the framework of the goal is therewith monitored outside of the goal. In addition and/or alternatively, one sector of the playing field area in front of the framework, i.e., in the area of the playing field, is monitored by another such camera module in order to determine the trajectory of the playing object in the direction of the goal. In any case, the image data of the camera module is sent to a suitable evaluation unit and/or central unit, which then controls the cameras for monitoring the goal line plane in a suitable manner and/or analyzes their image data in a suitable manner.

The cameras for monitoring the goal line plane can be high speed cameras with which 1000 images or optionally even up to or more than 4000 images can be recorded per second. This high number of images per second ensures that a playing body, even if it is moving at a very high speed, will be detected by the cameras in any case. The numerous cameras thereby ensure that a playing body, i.e., a ball will be detected even if there is one player or if there are many players in the field of vision of one camera. In a certain portion of the framework, for example, along a post or a crossbar, numerous cameras are expediently provided for monitoring the goal line plane, each camera being a uniform distance from the others.

In the same way as the cameras for monitoring in the form of a plane, the camera module may also have a high speed camera. In the simplest case the camera module has such a camera.

If a sector adjacent to the framework of a goal and at the side is monitored with the at least one camera module, this may include a reference plane which is coplanar with the goal line. Such a reference plane is preferably adjacent from the outside to a post and/or a crossbar of the framework. For this case the analysis of the image data of the cameras for monitoring the goal line plane as a function of the image data of the camera module is to be understood to mean that the image data of the cameras is disregarded in monitoring the goal line plane until the playing body, for example, a ball has completely crossed the reference plane from the direction of the playing field. In other words, in the event a ball travels laterally past the goal and, in doing so, thereby crosses said reference plane, this cannot be counted as a goal, so the image data of the cameras for monitoring the goal line plane is no longer relevant.

Another possible interaction between the camera module and the cameras for monitoring the goal line plane can be that a sector in the playing field region in front of the framework is monitored by such a camera module in order to determine the trajectory, i.e., the flight path of a playing body moving in the direction of the goal. If it is thereby detected that the playing body will in all probability strike in the region of the goal line plane, then the image frequency of the camera for monitoring the goal line plane may be increased suitably, for example, to ensure an improved measurement accuracy in detecting a goal. The cameras for monitoring the goal line plane may remain in or may enter a standby mode, for example, if the camera module detects that the playing body will miss the goal by a great deal, i.e., it will travel past the goal at a great distance. In this context, it should be pointed out that a predetermined playing field region can be detected by the camera module and/or focused at a maximum distance from the goal. In the field of the sport of soccer, this maximum distance from the goal may be defined by the 16-meter range, for example.

Another embodiment of the invention, provides for a goal recognition system in which multiple cameras monitor a goal line plane spanned by a crossbar of a goal. A mirror module, which aligns the beam path of the camera along the goal line plane, is assigned to at least one of these cameras. This has the advantage that the camera with its lens system may not be aligned precisely in the direction of the goal line plane but instead, thanks to the mirror module, it can also be disposed in a different position. This is advantageous in particular when the camera is mounted at least partially or completely in a part of the framework, i.e., inside a post or inside the crossbar of the goal. In this case, the camera may be aligned with its longitudinal axis essentially parallel to the longitudinal axis of the post or crossbar, which permits a particular space-saving accommodation.

In the same way as the cameras for monitoring the goal line plane, at least one camera module may also be accommodated at least partially or completely inside a part of the framework of a goal, i.e., inside a post or a crossbar. As an alternative to this, it is also possible for the camera module to be positioned outside of the framework, e.g., on its own stand or the like. In this way, the camera module may be positioned at the level of the goal end line, or as an alternative, also on at least one side edge of the playing field. Such an arrangement of the camera module also ensures that it can reliably monitor the aforementioned sectors outside of the goal.

If the cameras for monitoring the goal line plane are arranged inside of the framework, then it is self-evident that the opening which is formed in the framework will point in the direction of the goal line plane, so that the beam path of the cameras is aligned in the direction of the goal line plane. When using a mirror module, the opening is thereby aligned suitably. In the same way with an arrangement of a camera module inside the framework, an opening may also be formed therein, pointing in the direction outward, e.g., toward the side in the direction of the reference plane or toward the front in the direction of the playing field depending on the intended purpose of the camera module.

In the same way as with the cameras for monitoring the goal line plane, it may be advantageous with regard to the camera module if a mirror module which aligned the beam path of a camera of the camera module in the sector outside of the goal is assigned to the camera module. Due to the combination with a mirror module, there are greater degrees of freedom for the positioning of the camera module with respect to the framework of the goal. In mounting the camera module at least partially inside a part of the framework, for example, inside a post or a crossbar, thanks to the combination with the mirror module, it is possible to arrange the camera module in such a way that the longitudinal axis of a camera of the camera module is arranged essentially parallel to the longitudinal axis of a post or of a crossbar of the framework. This results in a compact design.

According to an embodiment, assembly of the cameras in or on the framework of the goal can be facilitated by the fact that the mirror module together with one camera for monitoring the goal line plane and/or together with the camera module form(s) a structural unit which may also include suitable fastening elements or the like. This permits free assembly of the structural unit, which can then be assembled in a single additional manufacturing step in a time-saving manner or in the framework of the goal.

According to an embodiment, the cameras and the at least one camera module may also be arranged in the framework in such a way that a respective lens system—without the use of a mirror module—is aligned directly in the desired direction, i.e., in the direction of the goal line plane, the reference plane and/or forward in the direction of the playing field. In this regard, suitable openings for the beam path of a respective camera with an alignment in the corresponding direction are also formed in the framework.

According to an embodiment, at least one damping element may be provided to protect the cameras, so that a respective camera and/or a respective camera module is mounted on the framework with the damping element. Vibrations of the framework when a playing body strikes it are at least diminished by the damping element or are not even transferred to a camera and/or a camera module.

According to an embodiment, the mirror module may have a main mirror which aligns the beam path of a camera assigned to it along the goal line plane and/or in the sector outside of the goal. The variability of the arrangement of the camera and/or the camera module with respect to the most space-saving arrangement, for example, inside the framework can be further improved by means of an additional mirror which is provided between the main mirror and the respective assigned camera.

The cameras for monitoring the goal line plane and the at least one camera module for monitoring a sector outside of the goal may be connected to a computer unit. This computer unit controls the respective cameras for generating an image recording and evaluates the image data thereby generated on the basis of a real-time analysis. If it is recognized on the basis of the image data of the cameras for monitoring the goal line plane that a playing body has completely crossed the goal line plane from the direction of the playing field, then a goal decision signal is generated, indicating that a goal has fallen. On the other hand, if it is recognized on the basis of the image data of the camera of the at least one camera module that the playing body has completely crossed the reference plane which is outside of the goal at the side adjacent to the framework, then a decision signal is generated, indicating that this is not being counted as a goal. These signals, i.e., a goal decision signal and/or a decision signal indicating that this is not a goal can be transmitted over a transmission link to a mobile reception unit in particular and can also be displayed thereon accordingly. In the same way, the image data of an image generated by a camera for monitoring the goal line plane and/or a camera of the camera module, which shows the playing body at a point in time when it has completely crossed the goal line plane and/or the reference plane, can be transmitted to the reception unit over a wireless transmission link. In the case of the mobile reception unit, it may be, for example, a wristwatch worn by the referee.

In an embodiment, several cameras which monitor a goal line plane spanned by a framework of the goal are used. In addition, at least one camera module is provided for monitoring a sector outside of the goal at the side adjacent to the framework or a sector in front of the framework in the region of the playing field in order to determine the trajectory of a playing body in the direction of the goal. An important feature of the method includes the fact that operation of the camera for monitoring the goal line plane and optionally the evaluation of its image data are controlled as a function of the image data of the camera module.

In an embodiment, the cameras for monitoring the goal line plane and the at least one camera module are controlled by a computation unit where the image data of the camera for monitoring the goal line plane and the at least one camera module is evaluated. A goal decision signal is generated if the playing body has completely crossed the goal line plane from the direction of the playing field. This is counted as a score of one goal. If the playing body has completely crossed the reference plane which is adjacent to the framework laterally outside of the goal, from the direction of the playing field, then a decision signal indicating that this is not a goal is generated, according to which the playing body has missed the goal and consequently the play is not scored as a goal. These signals and optionally the respective image data for representing the playing body when it has completely crossed the goal line plane and/or the reference plane can be transmitted according to claim 19 to a mobile reception unit in particular by means of a wireless transmission link.

It is self-evident that the aforementioned features and those yet to be explained below may be used not only in the respective combination indicated but also in other combinations or alone without going beyond the scope of the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

This invention is particularly suitable for those types of sports in which a playing body is played in the direction of an opponent's goal which spans a goal line plane. Examples of such types of sports include in particular soccer, handball, ice hockey, rugby, American football, field hockey or even polo. The following description of one embodiment of the invention relates to the field of soccer sports, where the playing body is referred to as a ball accordingly but it should be pointed out that the reference to the field of soccer sports is not to be taken as a restriction on the invention.

Figure 1:
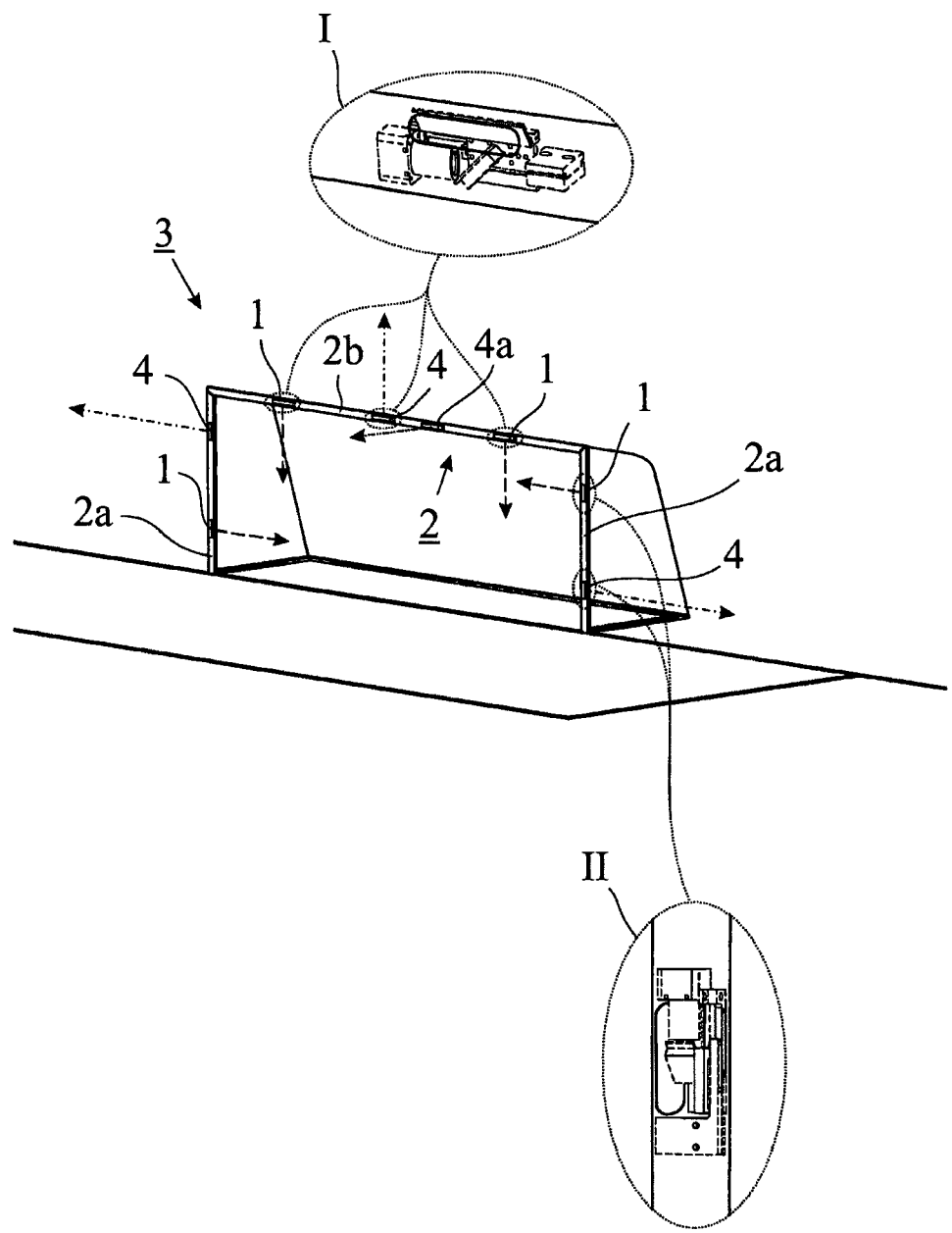
FIG. 1 is a perspective view of a framework of a goal, where the main axes of the beam paths of different cameras which are provided on the framework are indicated.

To illustrate the goal recognition system according to the invention, FIG. 1 shows a simplified perspective view of a goal on which several cameras are provided. Specifically, multiple cameras 1 are mounted on a framework 2 of a goal 3, such that both inside a post 2a and also inside a crossbar 2b. The cameras 1 serve to monitor a goal line plane E (cf. FIG. 2) where the main axis of the beam path of camera 1—each shown with dotted lines in FIG. 1—is directed inward. For reasons of simplicity, FIG. 1 shows only one camera 1 on each of the two posts 2a and the crossbar 2b. It is self-evident that several cameras may also be provided at a uniform spacing from one another on the respective posts 2a and on the crossbar 2b, for example, four cameras 1 along each post 2a and three cameras 1 along the crossbar 2b.

At least one camera module 4 is also provided in the two posts 2a and in the crossbar 2b. A camera of such a camera module 4 is positioned, so that its beam path runs outside of the goal 3, such that in a sector laterally adjacent to the framework (shown with dotted lines in FIG. 1), i.e., at the side of and outside of the posts 2a or above the crossbar 2b. For reasons of simplicity, FIG. 1 shows only one camera module 4 on each post 2a and/or on the crossbar 2b. In this context, it should be pointed out that in practice a plurality of camera modules 4 can be provided on each post 2a and/or on the crossbar 2b, preferably being spaced a uniform distance from one another.

In addition or alternatively, it is also possible to position a camera module, labeled as 4a in FIG. 1, so that the beam path of a camera of such a camera module 4a is directed forward in the direction of the playing field (shown with double dotted lines in FIG. 1). Accordingly with a camera module 4a arranged in such a way, a sector in front of the framework 2 in the region of the playing field may also be monitored to determine the trajectory of the ball. For reasons of simplicity FIG. 1 shows only one camera module 4a, such that in the central region of the crossbar 2b. In practice, additional cameras 4a, whose beam path is directed forward in the direction of the playing field, may also be provided on the crossbar 2b as well as on the two posts 2a.

Figure 2:
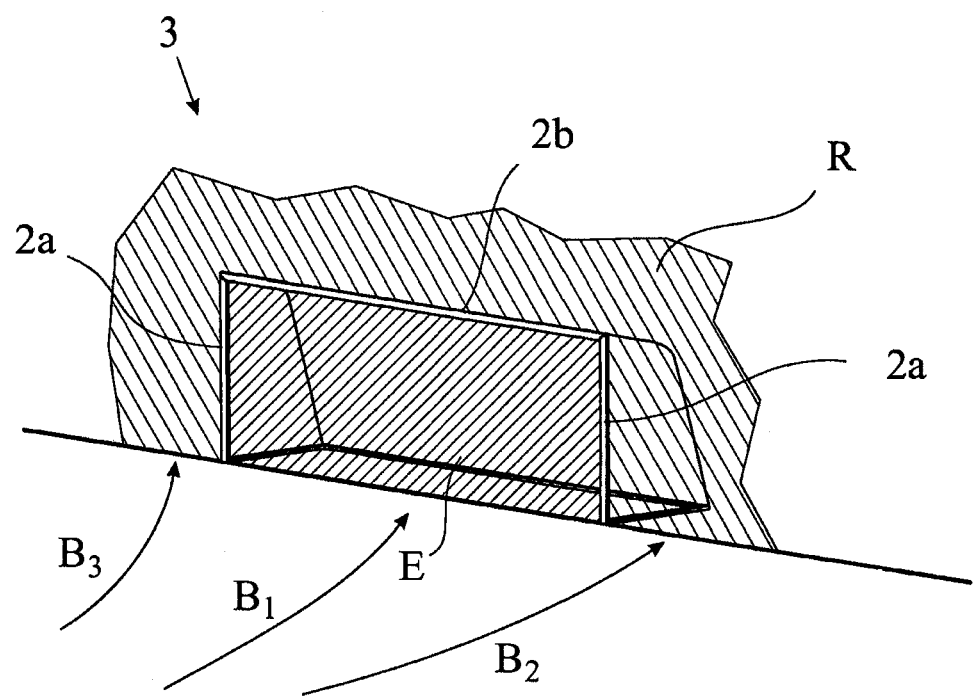
FIG. 2 is the framework of the goal of FIG. 1, where various trajectories of a playing body in the direction of the goal are indicated.

FIG. 2 shows the goal 3 of FIG. 1 also in a perspective view, indicating the claims monitored by the respective cameras. Within the framework 2 there is a goal line plane E which is spanned by the two posts 2a and by the crossbar 2b. The goal line plane E is precisely adjacent to a rear edge of the goal line T, which runs between the two posts 2a. The several cameras 1 are mounted on the framework 2 in such a way that their beam paths run along this goal line plane E, so that the goal line plane E can be monitored accordingly by generating images. The spacing of the individual cameras 1 relative to one another along a post 2a and/or along the crossbar 2b is selected, so that the recording ranges of the cameras 1 overlap one another in a suitable manner, so that it is possible to detect the goal line plane E without any gaps.

A reference plane R which is coplanar with the goal line plane E runs laterally adjacent to the framework 2. FIG. 2 illustrates that the reference plane R is adjacent laterally to the two posts 2a as well as from above to the crossbar 2b outside of the goal 3. As explained, the reference plane R is monitored by the camera modules 4 whose beam paths are aimed toward the sides starting from the framework 2 (dash dot lines in FIG. 1). The spacing of the camera modules 4 relative to one another on the framework 2 is selected, so that monitoring of the reference plane R without any gaps is ensured.

FIG. 2 additionally shows three examples of trajectories $B_1$, $B_2$ and $B_3$ which illustrate possible movements of a playing body in the form of a ball in the direction of the goal 3. These trajectories are explained in greater detail below.

Figure 3:
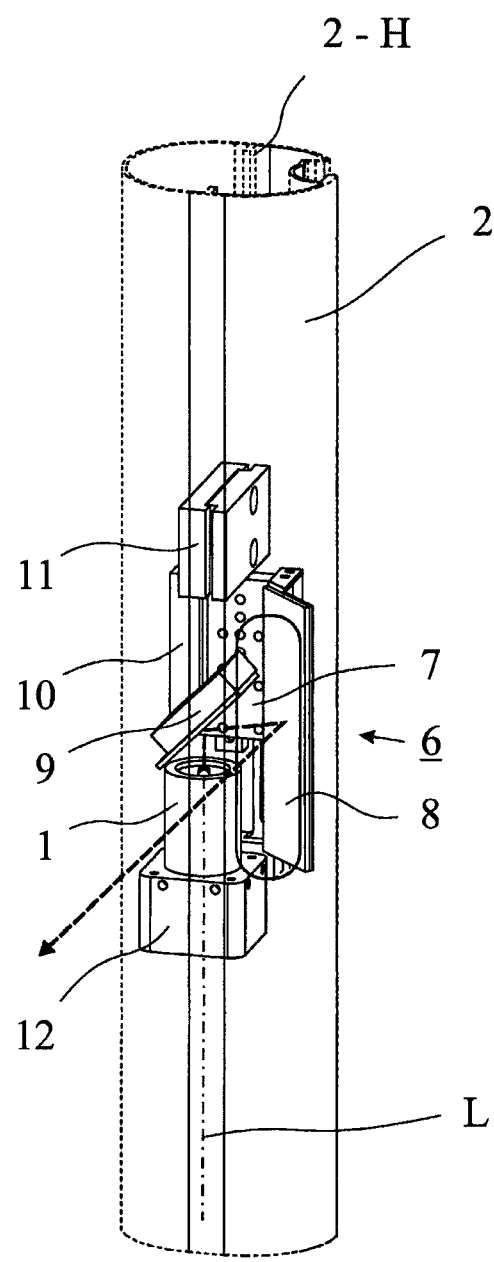
FIG. 3 is a detail of a part of a framework in which a camera is mounted in conjunction with a respective mirror module.

The detailed diagrams I and II in FIG. 1 represent the mounting of the respective camera 1 and/or the respective camera module 4, 4a inside the framework 2, i.e., inside a post 2a and/or inside the crossbar 2b. The diagram in FIG. 3 corresponds to an enlargement of the respective detailed diagram 1, 2 in FIG. 1. FIG. 3 is explained below as an example of a camera 1, where the mounting method explained here may apply equally to a camera module 4, 4a and its camera.

The part of the framework 2 shown in FIG. 3 may be a post 2a or the crossbar 2b. The framework 2 is indicated with phantom lines in FIG. 3, so that components situated inside the framework 2 are discernible. A mirror module 6 is assigned to camera 1, so that the camera 1 and the mirror module 6 adjoin together to form one structural unit. An opening 7 which faces in the direction of the goal line plane E is formed in the framework 2. The mirror module 6 comprises a main mirror 8 and an additional mirror 9, wherein the additional mirror 9 is situated between the main mirror 8 and a lens of the camera 1. A structural unit having the mirror module 6 and the camera 1 is positioned inside the framework 2, so that the main mirror 8 is aligned with the opening 7. As a result the beam path of the camera—indicated with dotted lines in FIG. 3—can escape through the opening 7 due to a suitable reflection on the additional mirror 9 and the main mirror 8, so that the goal line plane E can be monitored with the camera 1. This monitoring is ensured by the creation of images of the goal line plane E, as will be explained below with reference to FIG. 4.

The structural unit having the camera 1 and the mirror module 6 is positioned by means of a carrier element 10 which is clamped by means of a clamping element 11 on longitudinal rails 2-H which run within the framework 2 in the longitudinal direction of the framework 2. The camera 1 is connected to the carrier element 10 by means of a damping element 12. The damping element 12 diminishes the vibrations of the framework 2 suitably, for example, when a ball strikes it, and thus prevents any damage to the camera 1.

The assignment of the mirror module 6 to the camera 1 makes it possible for the camera 1 to be aligned with its longitudinal axis L essentially parallel to the longitudinal axis of the framework 2. This leads to a compact and space-saving arrangement of the camera 1 inside the framework 2. With the principle of the arrangement shown in FIG. 3, cameras 1, which have a greater extent in their longitudinal axis L, may also be provided. An accurate alignment of the main mirror 8 of the camera module 6 [sic; 4] with the opening 7 formed in the framework 2 is possible by means of the clamping element 11, which can be attached to the longitudinal rails 2-H in a suitable manner.

If a camera module 4 is mounted inside the frame 2 according to the principle illustrated in FIG. 3, then the opening 7 is aligned in the direction of the reference plane R. With respect to a camera module 4a, with which the beam path is directed forward in the direction of the playing field region, it is self-evident that the opening 7 inside the framework 2 is designed, so that it faces the playing field.

The cameras 1 and/or a camera of a camera module 4, 4a may include a high-speed camera as mentioned above with which it is possible to generate 1000 images per second, for example, optionally even up to or more than 4000 images per second. With these cameras it is possible to create either color images or black and white images and/or gray stage images. It is optionally also possible for these cameras to be 3D cameras.

Figure 4:
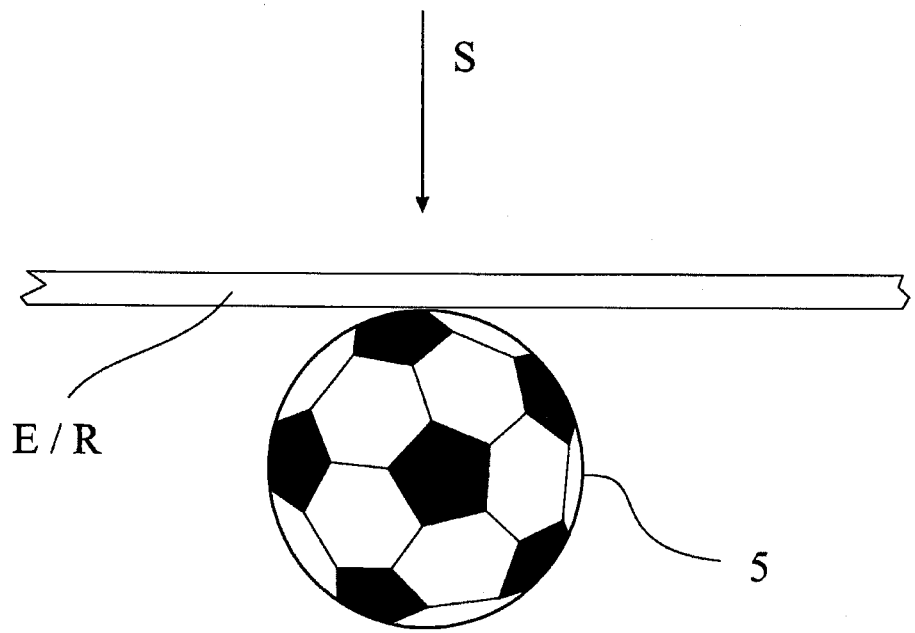
FIG. 4 is a schematic, highly simplified view to illustrate how a playing body can be detected by a camera in relation to a goal line plane and/or a reference plane.

The monitoring of the goal line plane E and/or the reference plane R by the camera 1 and/or a camera of a camera module 4 is illustrated in principle in simplified form in FIG. 4. The camera 1 presents an image of the goal line plane E while a ball 5 is played from the direction S and consequently crosses the goal line plane E. The possibility of a high speed of the ball 5 is taken into account by the fact that the camera 1 can generate several thousand (1000) images per second, for example, up to 4000 images per second. Because of this high-speed capability of the camera 1, it is possible to create one image for the point in time as soon as the ball 5 has completely crossed the goal line plane E. FIG. 4 shows an image recorded for precisely this point in time. According to the usual rules of play, it is scored as a goal when the ball 5 has completely crossed the goal line plane E. Thus by analyzing the image data of the camera 1 it is possible to recognize reliably whether or not a goal has been scored.

The principle of monitoring the goal line plane E illustrated in FIG. 4 is also applicable similar for the reference plane R which is monitored by a camera of a camera module 4. If the ball 5 has completely crossed the reference plane R, which is recognizable by a corresponding image recorded by the camera module 4, then it is clear that the ball 5 has either traveled past the side of the post 2a or has gone over the crossbar 2b, but at any rate it has not crossed the goal line plane E.

With respect to the cameras 1 with which the goal line plane E is monitored and the camera modules 4 with which the reference plane R is monitored, it is pointed out that a parallax correction can be provided. With this parallax correction it is possible to point the cameras exactly at a rear edge of the goal line plane E and/or the reference plane R. The parallax correction can be achieved, for example, by a pivoting mirror which is provided in the optical system of the respective camera.

Figure 5:
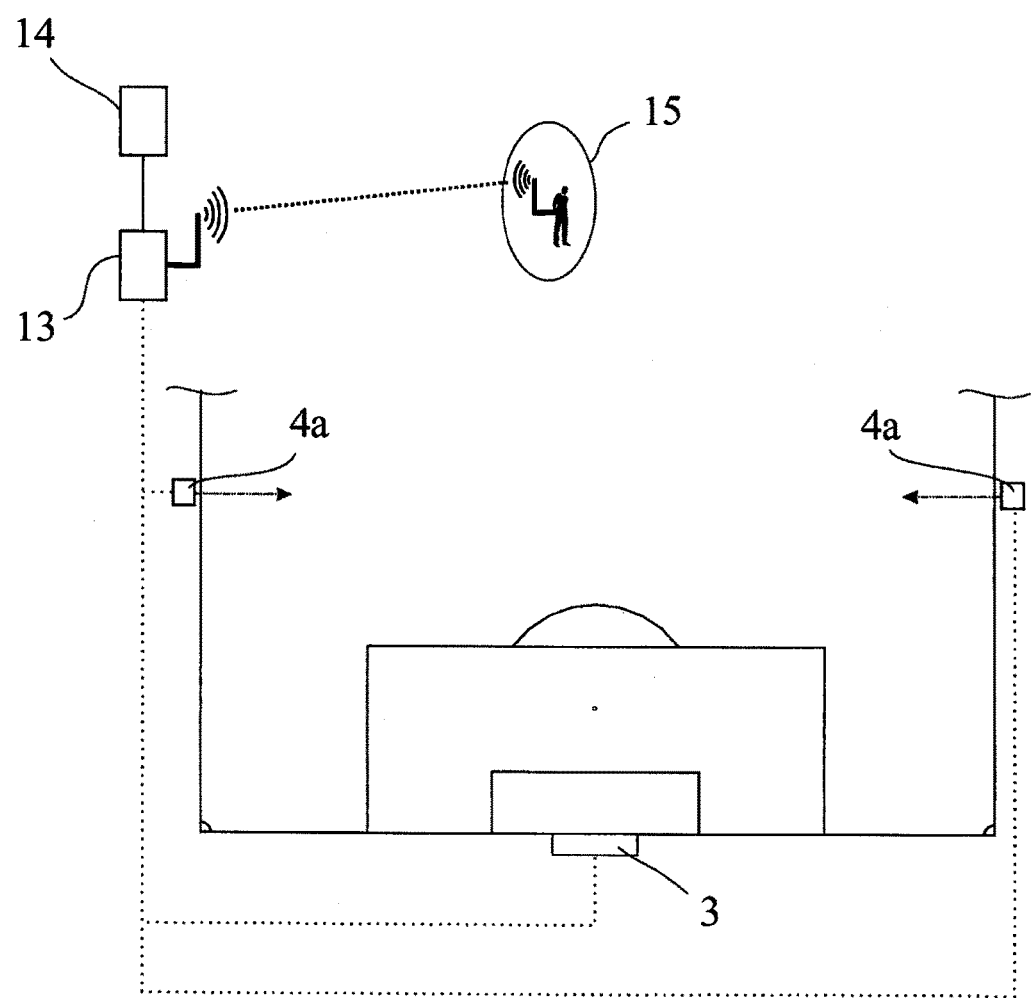
FIG. 5 is a simplified schematic diagram of additional components of the system proposed with which the image data of the cameras provided in the framework of the goal can be processed.

FIG. 5 shows, in a schematically greatly simplified view, additional components of the invention, namely a computation unit 13 to which the cameras 1 and the camera modules 4, 4a are connected, for example, by means of an efficient optical fiber cable or the like. The computation unit 13 is connected to a display device 14, with which the score or the like can be displayed. In addition the computation unit 13 can communicate with a mobile reception unit 15 which is, for example, a wristwatch worn by the referee. The communication between the computation unit 13 and the mobile reception unit 15 preferably takes place by way of a wireless communication link which is appropriately encrypted.

In the diagram in FIG. 5 it can also be seen that a camera module 4a with which a sector in front of the framework 2 of the goal 3 is monitored in the region of the playing field can be set up on the sidelines of the playing field, for example, either on one sideline or both sidelines. These camera modules on the sidelines of the playing field may be provided in supplement of and/or in alternation with a camera module 4a which is mounted on the framework 2 as explained in FIG. 1. The camera modules 4a mounted on the side edges of the playing field are also connected to the computation unit 12, as indicated by the dotted line in FIG. 5.

The invention functions now as follows:

The cameras 1 monitor the goal line plane E by generating a plurality of image recordings of the goal line plane E per second. The image data of the cameras 1 is analyzed by the computation unit 13 using a suitable image processing method. As soon as the ball 5 has completely crossed the goal line plane E from the direction of the playing field as illustrated in FIG. 4, for example, and in accordance with the trajectory $B_1$ of FIG. 2, a goal recognition signal is generated by the computation unit 13 after analyzing a corresponding image. This goal recognition signal is then transmitted directly to the mobile reception unit 15, which is being carried by the referee and is displayed on the mobile unit. Furthermore, the image data of the recorded image representing the ball 5 after it has completely crossed the goal line plane E can also be transmitted to the reception unit 15 and displayed there. Optionally it is also possible to provide for the referee to confirm the goal recognition signal by means of the reception unit 15 if this is consistent with his personal perception. In this case, a goal would be displayed on the display device 14 only when the goal recognition signal has been confirmed by the referee.

To illustrate the functioning of the camera modules 4, 4a, reference is made below to the examples $B_1$-$B_3$ for a trajectory of the ball 5 as shown in FIG. 2.

According to this example of the trajectory $B_2$, the ball 5 is moved from the outer right past the right post 2a outside of the goal. Accordingly the camera module 4 mounted on the right post 2a recognizes that the ball 5 has completely crossed the reference plane R. In this case, the image data of camera 1, with which the goal line plane E is monitored, would no longer be taken into account. In other words, the image data of a camera module 4 would be superimposed on the image data of the camera 1 after the ball 5 has completely crossed the reference plane R, so that the camera 1 would be completely disregarded. The background for this is that a goal is not counted when the ball 5 moves laterally past the post 2a or over the crossbar 2b. After the ball 5 has completely crossed the reference plane R and the corresponding image data has been transmitted to the computation unit 13, a decision signal indicating that this is not a goal is generated by the computation unit 13 and can also be transmitted by the computation unit 13 to the mobile reception unit 15 of the referee.

Monitoring of the reference plane R, which is laterally adjacent to the post 2a outside of the goal 3, for example, leads to the advantage that, among other things, no goal is scored in any case when the ball travels past the post 2a on the outside into the goal space. This is possible due to the fact that a decision signal indicating that this is not considered to be a goal is generated, as explained above, because the ball has crossed the reference plane R, so this rules out mistakes in decision in the course of a game.

Another possible use of a camera module 4a is the fact that a sector in the region of the playing field in front of the framework 2 is herewith monitored—as indicated by the double dotted line in FIG. 1 and FIG. 5, in order to determine the trajectory of the ball 5 and in particular the direction of this trajectory. The determination of a trajectory of the ball 5 in the course of a game can be improved by providing a camera module 4a not only on the framework 2 but also in addition on at least one sideline of the playing field or on both sidelines of the playing field—as illustrated in FIG. 5. The image data of the cameras of these camera modules 4a are analyzed in a suitable manner together by the computation unit 13, so that the exact position of the ball 5 on the playing field and its presumed trajectory in the direction of the goal 3 can be determined as a result.

With reference to the example of the trajectory $B_3$ of FIG. 2, it is possible to recognize by means of at least one camera module 4a, preferably by a plurality of such camera modules 4a, that the ball 5 is passing far to the left of the goal 3. It is thus unlikely or even impossible for the ball 5 to strike the goal line plane E. Accordingly it is not necessary for images to be recorded continuously with cameras 1 which monitor the goal line plane E. In other words, there is a suitable control of the cameras 1 for monitoring the goal line plane E by means of a suitable evaluation of the image data of the at least one camera module 4a with respect to the trajectory of the ball 5 in the region of the playing field.

As explained above, the cameras 1 may be controlled as a function of the image data of the at least one camera module 4a, such that operation of the cameras 1 is suspended, for example, and/or if the cameras are switched to a standby mode with only a low number of images per second if the ball 5 is presumably going to miss the goal. On the other hand, for the example of the trajectory $B_1$ of FIG. 2, the control of the cameras 1 may also be such that the image sequence is increased if it is recognized by the at least one camera 4a that the ball is moving in the direction of the goal line plane E and will enter the goal with a high probability, i.e., that the ball will completely cross the goal line plane E. The image sequence of the cameras 1 here may be increased from 1000 images per second to 4000 images per second to improve the measurement accuracy for recognition of a goal.

The goal recognition system explained above and the method associated with it fulfill the regulations of the FIFA currently in effect, according to which there must be both direct and indirect data transmission between a computation unit and the referee after a goal recognition signal has been generated. Exclusive transmission to the referee and/or to additional game officials is ensured by encryption of the transmission link to protect against false data and/or abuse of data.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A goal recognition system comprising:
   a plurality of cameras with which a goal line plane spanned through a framework of a goal is monitored; and
   at least one camera module with which a sector laterally adjacent to the framework or a sector of a playing field region outside of the goal in front of the framework is used to determine a trajectory of a playing body in a direction of the goal,
   wherein a operation of the camera for monitoring the goal line plane and/or evaluation of image data is controlled as a function of the image data of the camera module,
   wherein the camera module monitors a reference plane in a sector, and wherein the plane is coplanar with the goal line plane, and wherein the reference plane is adjacent to a post of the framework, and
   wherein the image data of the plurality of cameras for monitoring the goal line plane is disregarded if the camera module detects that the playing body has completely crossed the reference plane from the direction of the playing field.

2. The goal recognition system according to claim 1, wherein a mirror module, which aligns a beam path of the camera along the goal line plane, is assigned to at least camera with which the goal line plane is monitored.

3. The goal recognition system according to claim 1, wherein at least one camera module is provided with which a sector outside of the goal laterally adjacent to the framework or a sector of a playing field region in front of the framework for determining a trajectory of a playing body in the direction of the goal is monitored, and wherein the operation of the plurality of cameras for monitoring the goal line plane and/or the evaluation of their image data are controlled as a function of the image data of the camera module.

4. The goal recognition system according to claim 1, wherein the sector which is monitored outside of the goal by the at least one camera module in front of the framework is used to detect a predetermined playing field region with a maximum distance from the goal, wherein the plurality of cameras for monitoring the goal line plane are operated in a predetermined mode if a camera module detects that the playing body is moving in a predetermined playing field region in the direction of the goal line plane.

5. The goal recognition system according to claim 1, wherein the cameras for monitoring the goal line plane and/or the at least one camera module are disposed at least partially in or on the framework of a goal, wherein the framework has an opening for the beam path of a camera and/or a camera of at least one camera module.

6. The goal recognition system according to claim 1, wherein a mirror module is assigned to at least one camera module, the mirror module aligning the beam path of a camera system of the camera module in the sector outside of the goal laterally adjacent to the framework or in a playing field region in front of the framework.

7. The goal recognition system according to claim 5, wherein at least one camera for monitoring the goal line plane and/or one camera of the camera module is disposed with its longitudinal axis essentially parallel to the longitudinal axis of a post or a crossbar of the framework.

8. The goal recognition system according to claim 2, wherein the mirror module together with a camera for monitoring the goal line plane and/or together with the camera module forms a structural unit which is mounted completely inside a part of the framework.

9. The goal recognition system according to claim 5, wherein at least one camera for monitoring the goal line plane and/or at least one camera module is attached to the framework by a damping element so that vibrations of the framework are transferred to the camera and/or to the camera module only in diminished form or not at all.

10. The goal recognition system according to claim 2, wherein the mirror module has a main mirror that aligns the beam path of a camera assigned to it along the goal line plane and/or in the sector outside of the framework with at least one additional mirror, which aligns the beam path of the camera with the main mirror, provided between the main mirror and the camera assigned to the mirror module.

11. The goal recognition system according to claim 1, wherein a computation unit with which the cameras for monitoring the goal line plane and the at least one camera module is controlled and/or their image data are analyzed is provided, wherein a goal decision signal is generated on the basis of the image data of the cameras for monitoring the goal line plane when the playing body has completely crossed the goal line plane from the direction of the playing field, or on the basis of the image data of the camera of the at least one camera module, a decision signal indicating that this is not a goal is generated when the playing body has completely crossed the reference plane from the direction of the playing field.

12. The goal recognition system according to claim 11, wherein the goal decision signal or nondecision signal is transmitted over a transmission link to a reception unit or a mobile reception unit and is displayed.

13. The goal recognition system according to claim 1, wherein the image data of an image, which is generated by a camera and/or a camera module and recorded at a point in time when a playing body had completely crossed the goal line plane and/or the reference plane from the direction of the playing field, is transmitted over a transmission link to a mobile reception unit.

* * * * *